United States Patent
Mitchell et al.

[11] Patent Number: 5,727,170
[45] Date of Patent: Mar. 10, 1998

[54] USER DEFINED PORT AND PROTOCOL SCHEME FOR A PROGRAMMABLE LOGIC CONTROLLER

[75] Inventors: Ronald Mitchell, Johnson City; Temple L. Fulton, Elizabeth, both of Tenn.

[73] Assignee: Siemens Energy & Automation, Inc., Alpharetta, Ga.

[21] Appl. No.: 365,646

[22] Filed: Dec. 29, 1994

[51] Int. Cl.⁶ ............................................. H01J 13/00
[52] U.S. Cl. .................... 395/285; 395/284; 395/309; 395/652; 395/653; 395/830; 395/831; 395/833; 395/856; 395/858; 395/882; 395/883; 395/282
[58] Field of Search ............................. 395/280, 281, 395/297, 375, 309, 310, 284, 285, 286, 892, 652, 653, 830, 831, 833, 834, 856, 858, 862, 882, 883, 893

[56] References Cited

U.S. PATENT DOCUMENTS

| | | | |
|---|---|---|---|
| 4,270,184 | 5/1981 | Shimokawa | 364/900 |
| 4,937,419 | 6/1990 | Kolodziej et al. | 219/110 |
| 5,056,001 | 10/1991 | Sexton | 395/309 |
| 5,251,302 | 10/1993 | Weigl et al. | 395/250 |
| 5,270,943 | 12/1993 | Warn | 364/479 |
| 5,307,463 | 4/1994 | Hyatt et al. | 395/275 |
| 5,357,625 | 10/1994 | Arends | 395/500 |
| 5,371,736 | 12/1994 | Evan | 370/79 |
| 5,430,859 | 7/1995 | Norman et al. | 395/425 |
| 5,455,911 | 10/1995 | Johansson | 395/864 |
| 5,485,590 | 1/1996 | Hyatt et al. | 395/442 |

FOREIGN PATENT DOCUMENTS

| | | |
|---|---|---|
| 0022622 | 6/1980 | European Pat. Off. . |
| 880255932 | 4/1990 | Japan . |
| WO 91/19236 | 12/1991 | WIPO . |

*Primary Examiner*—Jack B. Harvey
*Assistant Examiner*—Raymond N Phan

[57] ABSTRACT

The PLC has a user configurable protocol port attached thereto. Briefly stated, at the PLC communication port or as a result of a user program or I/O event, a special flag bit may be set which thereby allows the communication port to be activated. This is done by the flag bit causing an interrupt to occur in the PLC user program which allows a user to communicate with a user specified protocol scheme rather than the normal communication/programming protocol when this special bit is not set.

14 Claims, 7 Drawing Sheets

USER DEFINED PORT AND PROTOCOL SCHEME FOR A PROGRAMMABLE LOGIC CONTROLLER

FIELD OF THE INVENTION

This invention relates, generally, to Programmable Logic Controllers and a user defined port and protocol scheme for a Programmable Logic Controller.

BACKGROUND OF THE INVENTION

Heretofore, Programmable Logic Controllers have had a tendency to be somewhat specialized or adapted to particular classes or categories of equipment. However, there is an increasing tendency and usage of Programmable Logic Controllers for smaller and smaller pieces of equipment. Moreover, there is also a tendency to use Programmable Logic Controllers which are adaptable to a variety of processes, systems and equipment. As a result, Programmable Logic Controller manufacturers have been and are required to produce smaller and less expensive controllers while providing increased adaptability and features. Further, competition has also forced manufacturers to produce a range of Programmable Logic Controllers from small units, commonly referred to as Brick type PLCs, to high-end complex units. However, regardless of the size or complexity, manufacturers are being required to produce PLC's at lower costs while still delivering additional features.

Accordingly, it is becoming increasingly important to provide PLCs which provide modular approaches. That is, the ability to enlarge a system by providing additional features and/or additional input/output analog and/or digital I/O. Modular systems allow for adaption to simple and complex situations as well as increasing in cost in more manageable incremental steps. Further, due to the increased use of Programmable Logic Controllers, it is now a de-facto requirement that such controllers be capable of being interconnected in a network type environment and being programmed and reprogrammed through a variety of means.

Programmable Logic Controllers typically encompass a primary controller having a plurality of I/O for digital and/or analog interaction. Frequently however, particular applications require I/O which is different than that provided or alternatively in greater numbers than that typically provided. As a result, expandable Programmable Logic Controllers have heretofore included a system of optional add-on modules. These modules have required a means for the primary controller to select individual expansion modules for access. Previous methods for achieving this selection have included the use of fixed back planes with individual select lines used to activate each module location. Therefore, the primary controller activates a specific select line to access a specific module. Alternatively, a fixed back plane has been used with distinguishing address codes provided at each module location. The primary controller therefore provides an address across an address bus that is matched by the receiving module against its pre-programmed location address.

A third approach has been the use of address switches or jumpers with each module modified at installation in order to provide a unique address. Further approaches have taken the form of a fixed sequence access where each module blocks access to succeeding modules in a chain until some state change sequence is completed. Once access to that particular module is completed, it passes through transactions to succeeding modules until some master signal indicates start of a new access sequence.

A fifth approach has been the use of position dependent data with data telegrams passed from module to module with each module extracting or adding data elements to the telegram at a location in the telegram corresponding to the modules position in the chain. However, the above approaches are increasingly difficult and cumbersome to utilize, particularly in brick style PLCs which have limited memory, limited processing capabilities and are of a small size in which to accommodate such functions.

Further, one of the primary and perhaps most important features of a PLC is its ability to operate a specified sequence or program in as fast a time period as is required. While it is recognized that the actual process itself is frequently not a high-speed "process" the various parameters which are measured require calculations which must be done in a high speed fashion so that the entire process is not disturbed. These high speed calculations typically utilize interrupt routines. Heretofore however, such interrupt routines have required a user to utilize a specific preset program section to which the PLC is to transfer control for the events of interest. Therefore, while a user could specify when an interrupt would occur, the user was limited as to a specific interrupt routine which could be carried out. This therefore limits the use of such processors or requires significantly long interrupts in that everything which might be of interest must be put into the same interrupt routine so that all contingencies are taken into account.

Moreover, there is an increasing need to utilize what is commonly referred to as high speed counters or functions. These counters or functions are utilized to distinguish time, frequency of events and the like in order to initiate subsequent events. Heretofore, once a preset number of events occurred it was required that the high speed counter be stopped and/or the high speed counter current value be perturbed, i.e., cleared to zero in order to reprogram the next preset value. This therefore resulted in a time delay or interruption during this reset or reprogram period. This is particularly problematic when a series of high speed counts are required in that subsequent resets of the counter induce a cumulative error or off-set in the total elapsed period of time.

Further problems with existing Programmable Logic Controllers deal with their communication ports. Programmable Logic Controllers generally provide a communication port for control of the operating system software. This communication port is required to allow programming of the PLC. However, these interfaces which communicate with the PLC either use the manufacturers proprietary communication protocol or a manufacturers library set or specified protocols. Further, while the communications function is an integral part of a PLC and is being used with increasing frequency, end users frequently cannot gain access to the port in a general purpose way from the user program. At best, some PLCs provide the user with the capability to send messages to a device such as a printer but do not allow messages to be received. Accordingly, it is difficult, expensive and sometimes virtually impossible for different PLC's to be utilized so as to accommodate a new or different protocol than that was originally designed or specified. At best, these additional protocols are not programmable via the normal interface or communication port.

Additional problems with existing PLCs deals with removable program memory. Removable program memory is a necessary function which is used to adapt a PLC to new equipment, different process, different parameters and the like. Heretofore, such removable program memory devices have used parallel access devices such as EPROM, battery backed RAM, or flash EPROM. These removable memory cartridges often must be inserted in a separate device such as a handheld programmer. This therefore dictates that downloading of new programs to individual PLCs is quite cumbersome and requires external devices. Moreover, it typically makes it very difficult for a specific PLC program to be propagated amongst other PLCs in the system or similar PLCs throughout a factory.

ADVANTAGES AND SUMMARY OF THE INVENTION

Accordingly, in view of the shortcomings of present day PLCs and of the enumerated demands and requirements imposed upon them, it would be advantageous to provide a Programmable Logic Controller having provision for modular expansion units which do not require fixed back-planes or any back planes. It is also desirable to produce modularly expandable PLC's which do not incur the cost and space requirements of switches or jumpers as well as the requirement that switchers or jumpers be properly set at the time of installation. Yet another advantage would be the use of simple, low cost asynchronous logic to provide modular expansion of PLCs. Still a further advantage would be to provide modularly expandable PLC's requiring no clock signal or state machinery in order to implement a sequential operation or identified data by a sequence count or timing.

It would also be advantageous to provide a user interrupt routine which may be dynamically assigned for use in a Programmable Logic Controller. Also advantageous is a PLC instruction and system capability to allow the PLC system to transfer control for one or more events of interest such as, for example, rising edge of an input point, high-speed counter current equal to preset, expiration of a specified time period, etc. Still another advantageous feature is a PLC which may in addition to assigning a program section will allow for De-assigning of programs sections from a specific event, i.e., specify that a particular event is no longer of interest for special processing by the user program, as well as assigning different program sections to an event based upon specific operating conditions. Particularly advantageous is the ability to dynamically reassign these interrupt routines during program execution rather than at compilation time and which may be automatically performed by the PLC system in order to effectuate control transfer.

Still a further advantage is a user defined dynamically assignable user interrupt routine in a PLC and system which allows a users PLC program to dynamically modify the specified high-speed counters preset value without stopping the high-speed counter and without perturbing the counters current count value. It is also desirable to have a PLC having a high-speed counter on a preset value which is updatable at various points of interest, i.e., an interrupt event at current value equal to preset value in order to dynamically re-program the next preset value of interest without perturbing the current state of the counter.

A further desirous feature is a PLC having a high-speed counter such that the current value may be allowed to continue counting without being reset to zero while the next preset value of interest is reprogrammed. Still a further desirous feature is a PLC having a high-speed pulse train output which provides for pipelining or Queueing which therefore allows a users PLC program to facilitate multi-step pulse train output operations with no "dead time" between steps in a sequence of operation.

An additional advantage is the ability to effectively eliminate cascading errors as a result of complete resets of counter operations during high-speed counts. Yet another advantage of a PLC such as that according to the present invention is the ability to provide for an additional step in a sequence of operations which allows said sequence to be pipelined in parallel with execution of a program step whereby the PLC system automatically initiates the Queued step at completion of the one in progress.

A further desirable advantage of a PLC is to provide the user with access to communication functions inherent in the PLC such that the user can exert full control over the function from the user program. Still a further advantage of the present invention is to have a capability whereby the user may create a program that will be executed under the management of the PLC where such capability will support any communication protocol the user wishes to implement (within of course the bounds of the capability of the device that is used to implement the communication function).

A further advantage of the present invention is to provide this protocol change scheme through use of a universal asynchronous receiver/transmitter (UART) device, thereby providing interrupts to the system that indicate that a character has been received or transmitted along with status indications. Still a further advantage of the present invention is the use of a virtual UART or a reflection of a UART which is accessible in the user data space.

Yet another advantage of the present invention is to provide a virtual UART which allows the user to provide for transmission and reception of interrupts, access to the transmission and receipt of data registers, access to control and status information, i.e. transmit buffer empty, baud rate, parity selections, framing error indications, etc.

Still a further advantage is to provide a PLC which provides for communication port changeability which allows a users PLC program to receive a signal character via a standard communication port such that the PLC system transfers control to a user-specified program for handling of the character received thereby providing an "on the fly" protocol as desired and defined by the user. A further advantage of the present invention is to provide such communication protocol changes without the use or requirement for additional or supplementary intelligent I/O modules.

A further advantage of the present invention is a PLC instruction and system capability which allows a users PLC program to initiate a receive operation in order to receive a multi-character message so that the PLC system may transfer control to a user specified program for handling the received message. Yet another advantage of the present invention is to provide a PLC instruction and system capability which allows the user's PLC program to initiate a receive operation for a single character or multi-character messages or combinations thereof in order to initiate PLC system transfer control to a user specified program. It is still a further advantage to provide such protocol capabilities which would effectively allow for communications with existing hardware technology such as, for example, bar code scanners, communications pagers and the like.

Still a further advantage of the present invention is a provision for a serial access, electrically erasable, reprogrammable read-only memory (EEPROM) which may be used to store user programming data. Yet another advantage and desired feature is a memory cartridge which may be reprogrammed in place by user command, then used to transport the user program and data to another PLC. Still a further advantage of the present invention is to provide for a memory cartridge which allows implementation in heretofore unknown unusually small memory cartridges and requiring only four electrical connections.

Still a further object of the present invention is to provide a user definable protocol scheme for a Programmable Logic Controller (PLC), comprising a PLC having at least one input and one output terminal for transmitting and receiving respectively predetermined signals; at least one microprocessor contained in the PLC for executing a plurality of user specified communication protocol schemes; a communications port connected to the PLC for facilitating communication between the PLC and at least one external device according to at least one of the protocol schemes; and a protocol initiation means cooperating with the at least one microprocessor for enabling the PLC to execute one of the plurality of user specified communication protocol schemes via the communications port.

DESCRIPTION OF THE DRAWINGS

Reference may be now had to the accompanying drawings in which.

DETAILED DESCRIPTION OF THE PREFERRED EMBODIMENT

Preliminary to a description of the operating system and hardware of the present invention, it is submitted that a general overview of the present invention is appropriate in order to assist in understanding of the invention. Further, it is understood that where referred to below, the skill to actually write programming instructions and user program code incident to the present invention are similar to those presently known and available to one skilled in the art and to some extent are dependant upon the actual hardware or operating system utilized. Therefore, with the exception of exemplary programs described more fully below, a more detailed description of actual code will not be provided.

Figure 1:
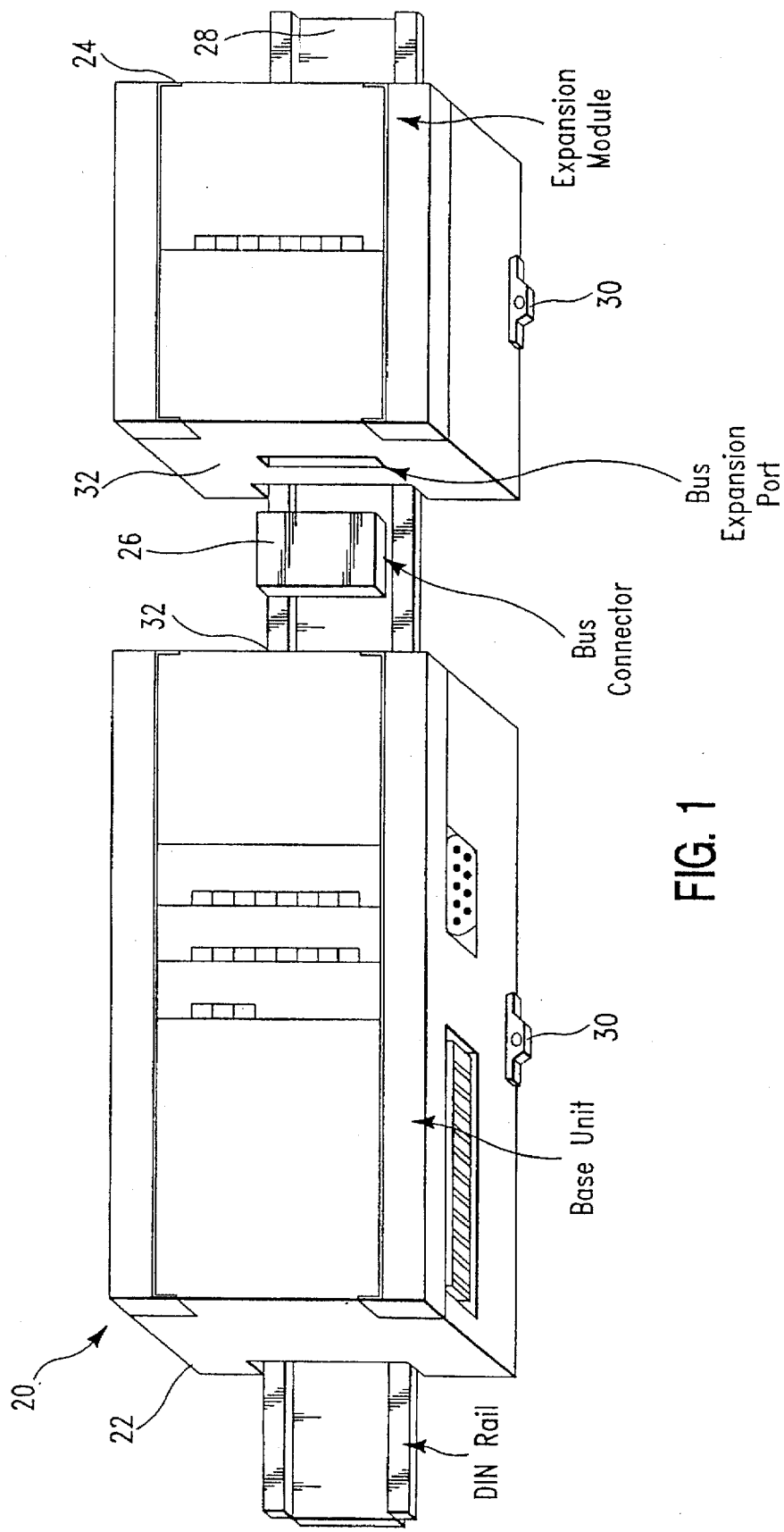
FIG. 1 is a representative perspective view of a base unit, an expansion I/O model and a bus connector of the PLC system of the present invention.

Referring now to FIG. 1 there is shown a PLC system indicated generally at 20. A PLC system is comprised of a CPU or base unit 22 which may cooperate with an expansion or input-output (I/O) module 24. It is to be understood that expansion module 24 may be one of a plurality of expansion modules. Further, it is to be understood that use of the basic base unit 22 does not in and of itself require an expansion module 24. Interconnection of base unit and I/O modules 22, 24 respectively is accomplished by a bus connector 26 which cooperates with I/O expansion ports 32. In the preferred embodiment of the present invention a base unit 22 is electrically interconnected to I/O module 24 and subsequent I/O modules are connected to adjacent I/O modules (not shown) by use of bus connectors and expansion ports 32 which are disposed on either side of I/O module 24.

The bus connector, in the preferred embodiment of the present invention, in an edge card to edge card connector which cooperates with the circuitry contained within base unit 22 and expansion module 24. However, it is to be understood that other connectors can and may be utilized without departing from the spirit and scope of the present invention. The base unit 22 as well as expansion module 24 are slideably mounted on DIN rail 28 and base unit 22 and expansion module 24 are "hung" on DIN rail 28 and maintained in place by retention/DIN clip 30. Since DIN rails and their operation with components are readily known to those skilled in the art, a more detailed description will not be had.

Figure 2:
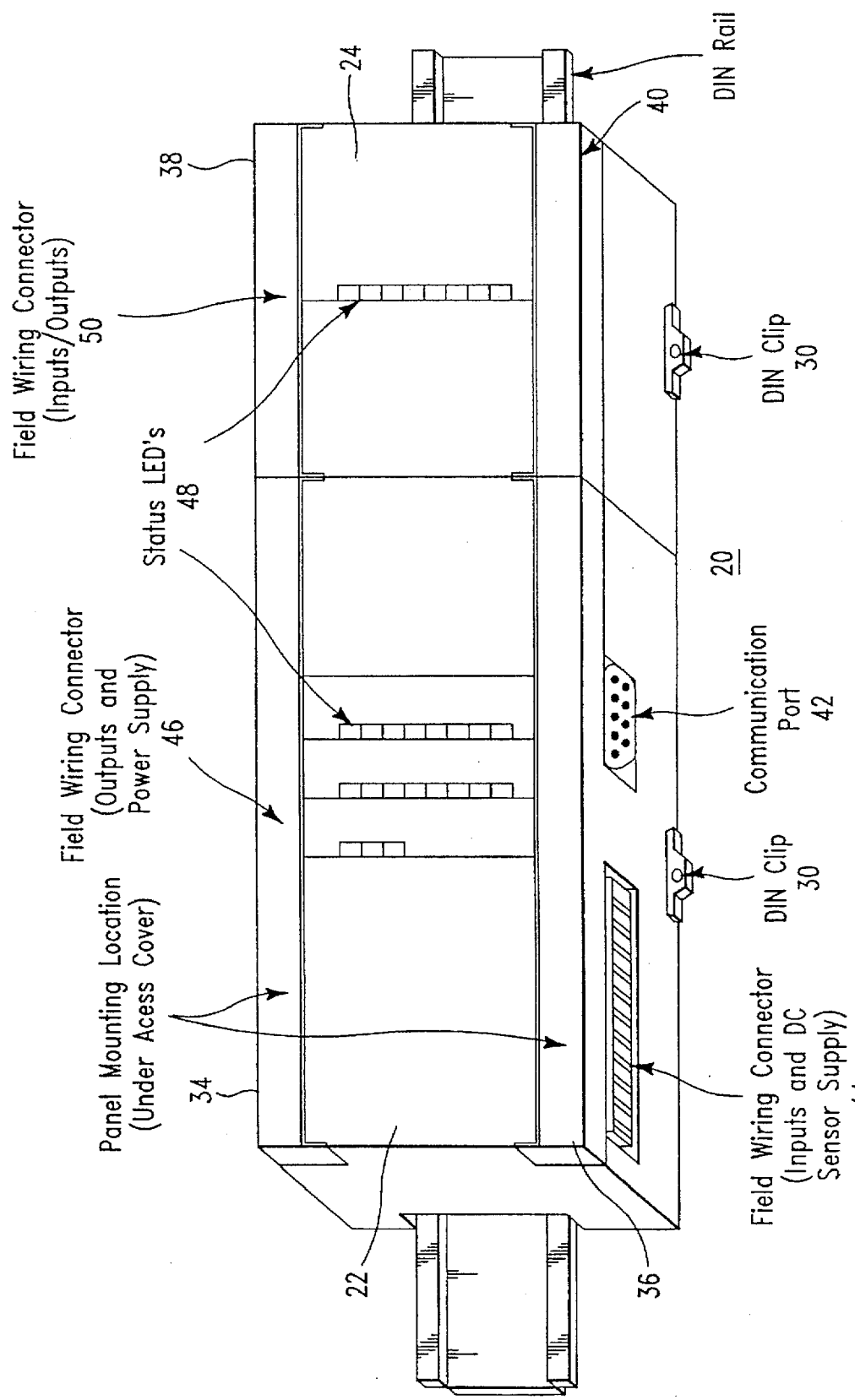
FIG. 2 is a perspective view similar to FIG. 1 showing interconnection of the components illustrated in FIG. 1.

Referring now to FIG. 2 there is shown a exemplary perspective view of the PLC system 20 of the present invention in further detail, showing the mating of base unit 22 to expansion module 24. Here it can be seen that base unit 22 has an output access cover 34 and an input access cover 36. These covers are pivotly hinged and allow for the interconnection to external devices as is normally done with Programmable Logic Controllers and is readily known and available to one skilled in the art. Expansion module 24 similarly has an I/O module upper access cover 38 and an I/O module lower access cover 40 which are used for Input and Output wires as appropriate. In this regard, and as described more fully below, in the preferred embodiment of the present invention I/O module 24 may have different I/O configurations depending upon user requirements such as, for example, digital input, analog input or a combination of the two as appropriate.

Disposed along the periphery of base unit 22 is a communication port 42 which is comprised of a connector which is utilized to interconnect a plurality of base units 22 as well as for communication purposes and as a port for different protocol schemes and the like as described more fully below. Disposed along the same side of base unit 22 as communication port 42 is an input connector 44 which allows for connection of wires adjacent input access cover 36. In a similar fashion, and although not shown, a similar connector may be disposed adjacent access cover 34 such as 46 while an I/O module connector 50 is disposed adjacent I/O module upper access cover 38.

Disposed on the face of base unit 22 and I/O module 24 are a plurality of status LEDs 48. These LEDs indicate the status of various registers and operation within the device itself as described more fully below, although it is to be understood that the use of status indicators and the like on PLCs is readily known and available to one skilled in the art. Further, it is to be understood that other orientations of connectors, status indicators, port access and the like may be utilized without departing from the spirit and scope of the present invention as well as the use of mounting devices other than DIN rails.

Figure 3:
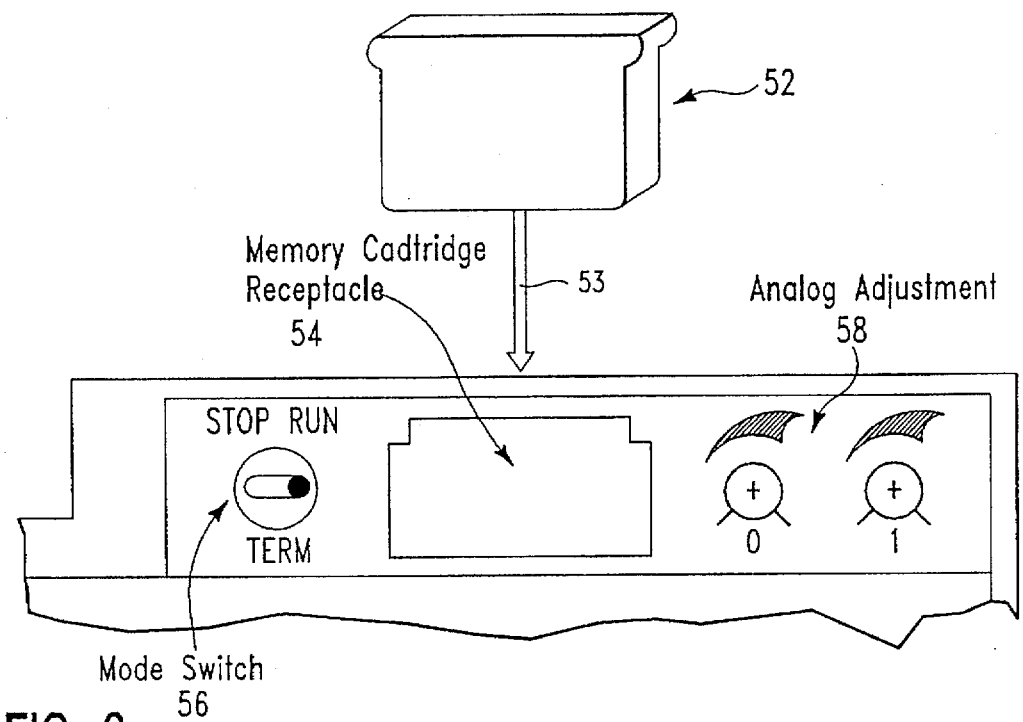
FIG. 3 is a diagrammatic representation of the use of the memory cartridge of the present invention with respect to the base unit of the present invention.

Referring now to FIG. 3 there is shown how a memory module 52 which is comprised of an EEPROM, as described more fully below is insertable in the direction of arrow 53 into memory cartridge receptacle 54. The area adjacent receptacle 54 is disposed under access cover 34 of base unit 22. Disposed on either side of receptacle 54 are mode switch 56 and analog adjustments 58. Analog adjustments 58 are used to hold the digital value that represents the position of the analog adjustment and in the preferred embodiment of the present invention the value is derived from the analog adjustments and may be used by the program to update the timer, the counter current, preset values or to set values or limits as appropriate.

Mode switch 56 is, in the preferred embodiment of the present invention, a three position switch. When this switch is in the STOP mode the user is be able to create/edit a user program although execution of the user program is not permissible. When this switch is in the RUN mode, the user program resident in base unit 22 is executed while simultaneously inhibiting the user from creating or editing the user program. However, user data values may be modified while in the RUN mode since changing the value does not edit the program itself. When the switch is in the third or terminal position-TERM, base unit 22 allows mode changes received through the communication port or from intelligent modules (not shown) in order to determine the PLCs operating mode as well as mode change commands which may come from programming or operating interface devices through the communication port, as described more fully below.

Figure 4:
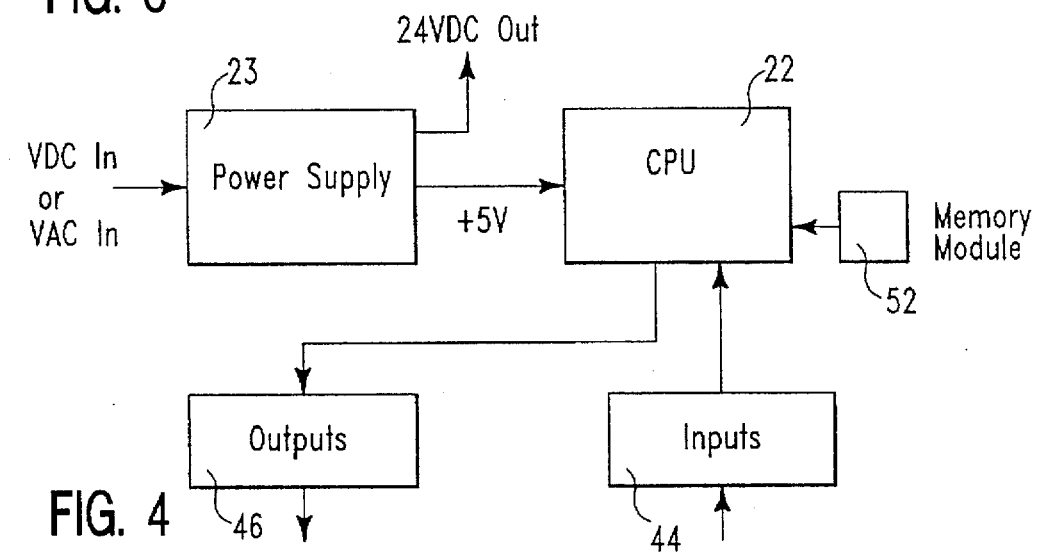
FIG. 4 is a block diagram of the various functions and components of the PLC system according to the present invention.

Referring now to FIG. 4 there is shown a functional model or diagram of the present invention. In the preferred embodiment of the present invention, the power supply produces 24 and 5 volts DC output as a result of DC or AC input voltage. The power supply 23 powers base unit or CPU 22. Memory module 52 is connectable to CPU 22 in the preferred embodiment of the present invention and is part of an edge card connector. Module 52 is a serial device requiring only four electrical wires between memory module 52 and CPU 22 as described more fully below. Inputs and outputs 44, 46 cooperate with CPU 22 in order to receive data or perform functions and commands as is typical and readily known to one skilled in the art with respect to Programmable Logic Controllers. Additionally, although not shown, during power up of the PLC, as is normal and expected in Programmable Logic Controllers, a plurality of diagnostic checks are performed including determining whether memory module 52 is present. Also, during power-up the memory module when present is also tested for diagnostic purposes.

Figure 5:
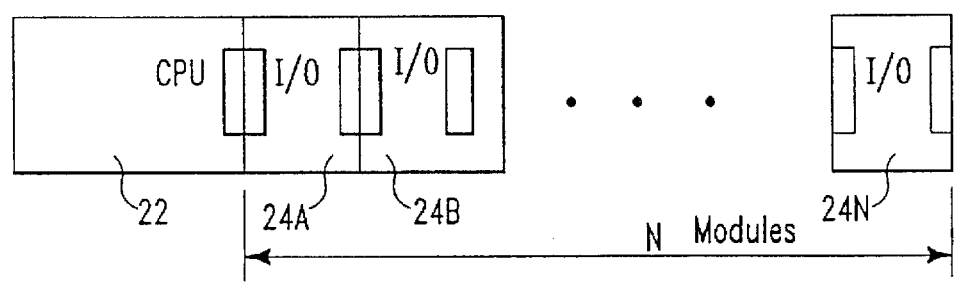
FIG. 5 is a representative diagram illustrating the ganging or use of multiple I/O modules according to the present invention.

Referring now to FIG. 5 the I/O bus expansion characteristics of the present invention may be seen. Shown are memory modules 24a, 24b–24n where n represents the total number of modules. It is to be understood that in the preferred embodiment of the present invention seven modules may be utilized although it is to be understood that a lower or higher number of modules can and may be utilized depending upon the capabilities required of the various modules as well as the overall speed of the system required and the capacity of CPU base unit 22.

Figure 6:
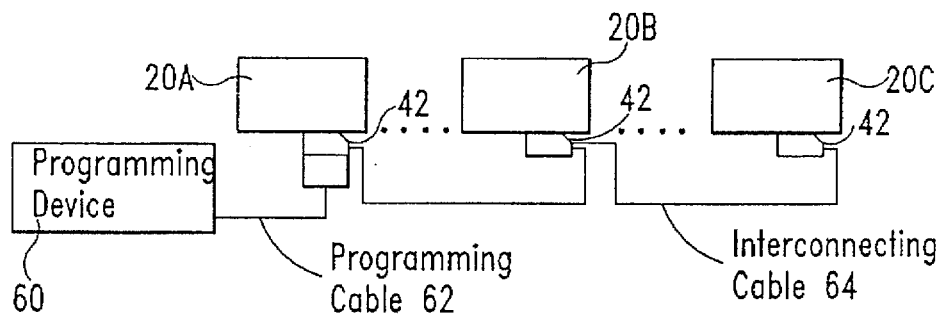
FIG. 6 is an interconnection diagram illustrating the interconnection of a plurality of base units interconnected to a plurality of similar base units according to the present invention.

Referring now to FIG. 6 there is shown the interconnection scheme amongst adjacent PLC systems 20 as indicated by 20a, 20b and 20c. Various PLC systems 20 are interconnected to each other by interconnecting cable 64. Connected to at least one PLC system 20 is programming cable 62 which is thereafter connected to programming device 60. It is to be understood that the interconnecting cable 64 as well as programming device 60 may remain connected to the system or may be removed once programming is accomplished or communication between the various PLC systems 20a, 20b and 20c is no longer required. Interconnecting cable 64 cooperates with Comm Port connecter 42 disposed on each base unit 22. Although not shown, one or more I/O modules 24 may be connected to one or more PLC base units 22 and therefore PLC systems 20 without departing from the spirit and scope of the present invention. In the present fashion, programming of all of the PLCs may be accomplished at the same time while communications between the PLC systems or the programming device 60 may also be accomplished thereby operating in a network mode or fashion.

MEMORY UTILIZATION AND I/O MODULE EXPANSION

Figure 7:
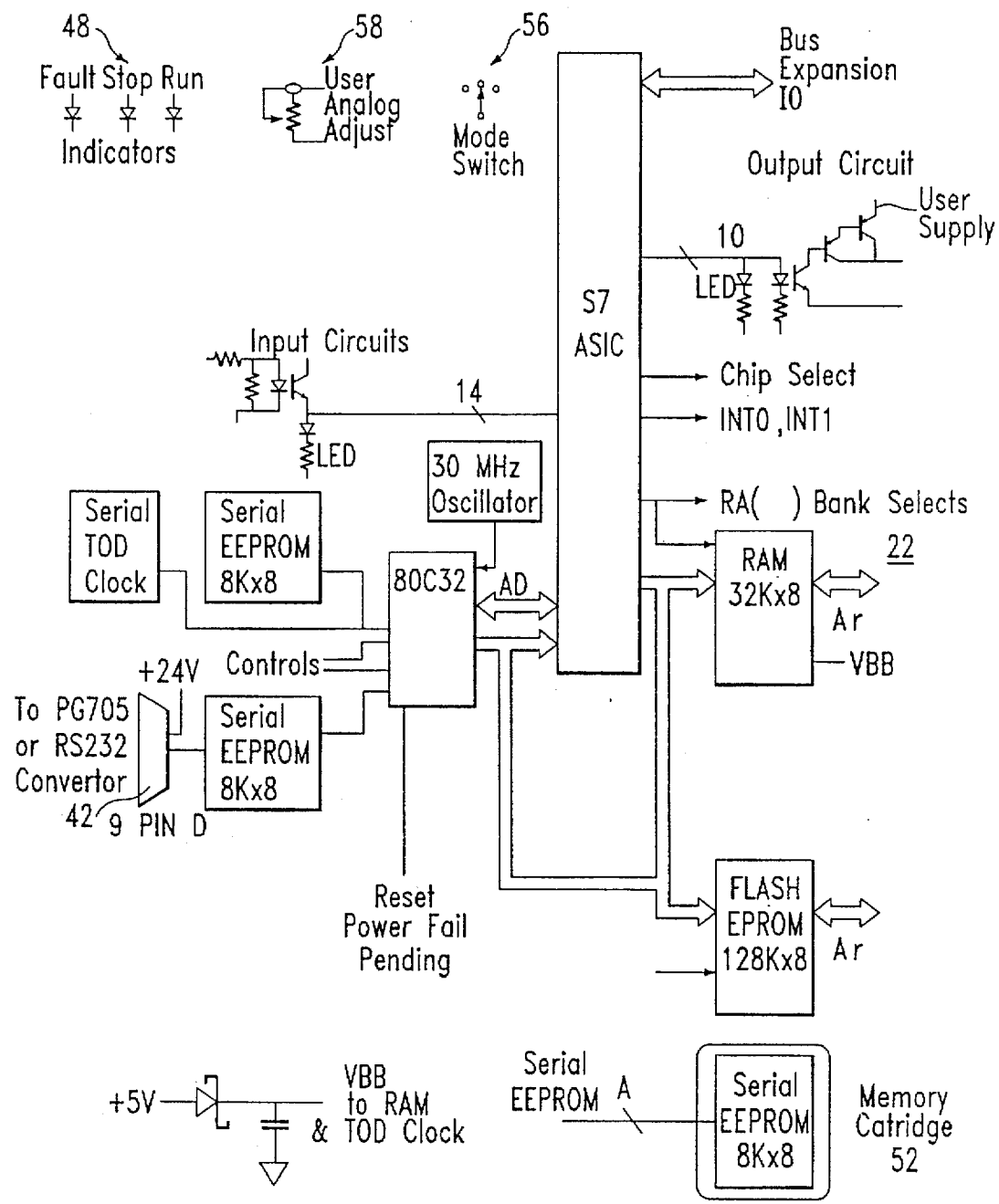
FIG. 7 is a block diagram of a base unit according to the present invention.

Referring now to FIG. 7 there is shown a block diagram of the CPU or base unit 22 of the present invention. At the heart of the base unit 22 is a central processor and, in the preferred embodiment of the present invention is an 80C32. However, it is to be understood that other types of processors can and may be utilized without departing from the spirit and scope of the present invention. Connected to the 80C32 processor is an ASIC which provides a multitude of functions inherent in PLC devices. Such features and "services" include:

1. Processor bus support logic, including address/data De-multiplexing and local chip selects;
2. Paging logic to map external memory space into the 80C32 processors program and data storage areas;
3. Local I/O buffering and filtering;
4. Directed interrupt branching for software counting of inputs and branching to user interrupt routines as described more fully below;
5. High-speed input counters and high-speed pulse output functions;
6. I/O Bus interfacing for expansion modules 24;
7. Watchdog timers; and
8. Timers for the potentiometer inputs 58.

It can also be seen that data and address lines are connected to the 80C32 processor and cooperate with the ASIC the RAM and flash EPROM. In the preferred embodiment of the present invention, the RAM is an 8 by 32K size RAM having a capacitor utilized to provide backup power in order to hold the contents of the RAM during intermittent power interruption. This 8 by 32K RAM provides space for all volatile data such as operating system scratch pad data, message buffers, non-retentive user data, and user compiled code. It is to be understood that other functions and/or other size rams may also be utilized without departing from the scope of the present invention.

In a preferred embodiment of the present invention, the flash EPROM is an 8 by 128K EPROM although other sizes can and may be utilized without departing from the spirit and scope of the present invention. This flash EPROM stores system code and has a plurality of sectors therein such that each sector may be independently erased and reprogrammed. However, it is to be understood that standard EPROM may be utilized without departing from the spirit and scope of the present invention. Also shown connected to the ASIC are various pinouts as is normally encountered in digital circuit design such as chip select, interrupt zero (INT 0), interrupt one (INT 1) as well as bank selects. Additionally connected to the ASIC are isolated output circuits which in the preferred embodiment of the present invention are opto-coupled and have LED indicators which may be used for the recited status indicators and the like.

A master 30 Mhz oscillator provides system timing while the 80C32 has connected thereto a reset pin in order to facilitate pending power failures and therefore efficient shut downs. Also connected to the 80C32 processor is an RS-485 driver which is thereafter connected to Comm Port connector 42. In the preferred embodiment of the present invention a 485 driver has been utilized although other drivers can and may be utilized without departing from the spirit and scope of the present invention. In this case an Rs-232 converter is shown and utilized. It is this RS-485 driver which also cooperates with the dynamically changeable interrupt scheme of the present invention as described more fully below.

Also connected to the 80C32 processor is a serial time of day clock in order to provide real time information. As shown, there is provided an 8×8K serial EEPROM which is connected to the 80C32 processor which stores user code and user and system data that must be maintained through an extended period where there is no power. This provides the advantage of not requiring the user to download user code to a PLC after power interruption, modifications and the like. This serial EEPROM is resident in the CPU or base unit 22. A second serial EEPROM having 8×8K memory forms the core of memory cartridge 52 and is intermittently connectable to the PLC base unit 22, when desired, as shown in FIG. 3. A serial access EEPROM is utilized because by only requiring four electrical connections an unusually small memory cartridge may be utilized. Additionally, since this memory access is serial, it is much smaller and less expensive to connectorize and much more easily protectable from electrostatic discharge interference and the like. This is particularly so in contrast to heretofore used parallel access methods which typically require 20 or more connections, are extremely sensitive to electro-static discharge interference, are much more expensive to connectorize and protect from inadvertent electro-static interference. Additionally, it has been found that since speed is generally not required when interfacing with a memory module such as module 52, the time penalty for serial access for reading and writing to the EEPROM is not a consideration.

This EEPROM memory cartridge 52 is connected to the 80C32 processor through conventional electrical connectors and is preferably an edge card style connection. Additionally, it is to be understood that although in the preferred embodiment of the present invention an EEPROM is utilized, memory cartridge 52 may be simply comprised of a ROM which would therefore allow user programs to be downloaded directly through the 80C32 to the resident serial EEPROM. In this fashion, a ROM type memory cartridge could be used to update a plurality of PLC base units. However, a serial EEPROM is utilized so that user code can be uploaded from the resident serial EEPROM to the memory module for further propagation to other PLCs, use or study by the user or the like thereby rendering the PLC a type of "programmer."

Also shown are indicator LEDs such as status indicators 48 which indicate whether the base unit 22 is in a FAULT, STOP or RUN mode. Accordingly, these indicators as shown on FIGS. 1 and 2, indicate SF which is preferably a red LED indicating a System Fault and light up if the base unit 22 has incurred a fatal error. Similarly, the RUN LED which is preferably green indicates that the PLC is in the RUN mode and is executing user programs while the STOP LED is preferably yellow and indicates that the Programmable Logic Controller is in a STOP mode and that program execution has stopped.

The remaining indicators when labeled I are preferably green and indicate the current state of the input points to the PLCs system and are therefore logic side-status indicators while the indicators labeled Q on base unit 22, which are preferably green, indicate the current state of the output points and are therefore logic side-status indicators. Further, although not shown, expansion modules 24 may also utilize Q indicators if output points are resident on the module.

As indicated, memory cartridge 52 provides field upgrade capability to a base unit such as PLC system 20 without having to use a programming device 60. Memory cartridge 52 effectively duplicates the internal non-volatile storage provided in base unit 22 and when installed supercedes the information that was contained in the resident serial EEPROM.

Installation of or use of memory cartridge 52 is relatively simple. In order to copy a program from the memory cartridge to the internal memory of base unit 22 all that is required is that the memory cartridge 52 be installed and the base unit 22, be power cycled (turned off then on). Thereafter, the memory cartridge 52 may be removed or may be left in place as desired. Upon download of a program from memory cartridge 52, the information is first loaded into the resident serial EEPROM using the same bus as the serial EEPROM. It is then loaded into the RAM which performs a check-sum in order to ensure the integrity of the download and is thereafter loaded to the resident EEPROM again. In this fashion, the RAM is utilized to maintain input values (i.e. gallons measured, pounds, weighed, etc.) while the resident serial EEPROM maintains the actual user program.

A supercapacitor is utilized to maintain data in portions of the RAM where such user values as mentioned are stored. In order to copy a program into the memory cartridge 52 all that is required is that the memory cartridge 52 be installed as previously indicated. A programming device such as 60 must then be used to command the 80C32 processor to copy memory to the memory cartridge 52 and thereafter the memory cartridge may be removed or left in place as desired. Upon writing of user programs to the memory cartridge 52, the program is first sent from the resident serial EEPROM to the RAM where a check-sum is performed and thereafter the user program along with the check-sum values as previously indicated are then sent to the memory cartridge. When the base unit 22 receives a command to copy the program to a memory cartridge 52, RAM data such as the user program the first 128/512 bytes of the user data; the station address; retentive range definitions if present; freeze/ copy status and output table values for RUN to STOP transition; password and restriction classes, and all forced operands and their values are also automatically copied.

Figure 8:
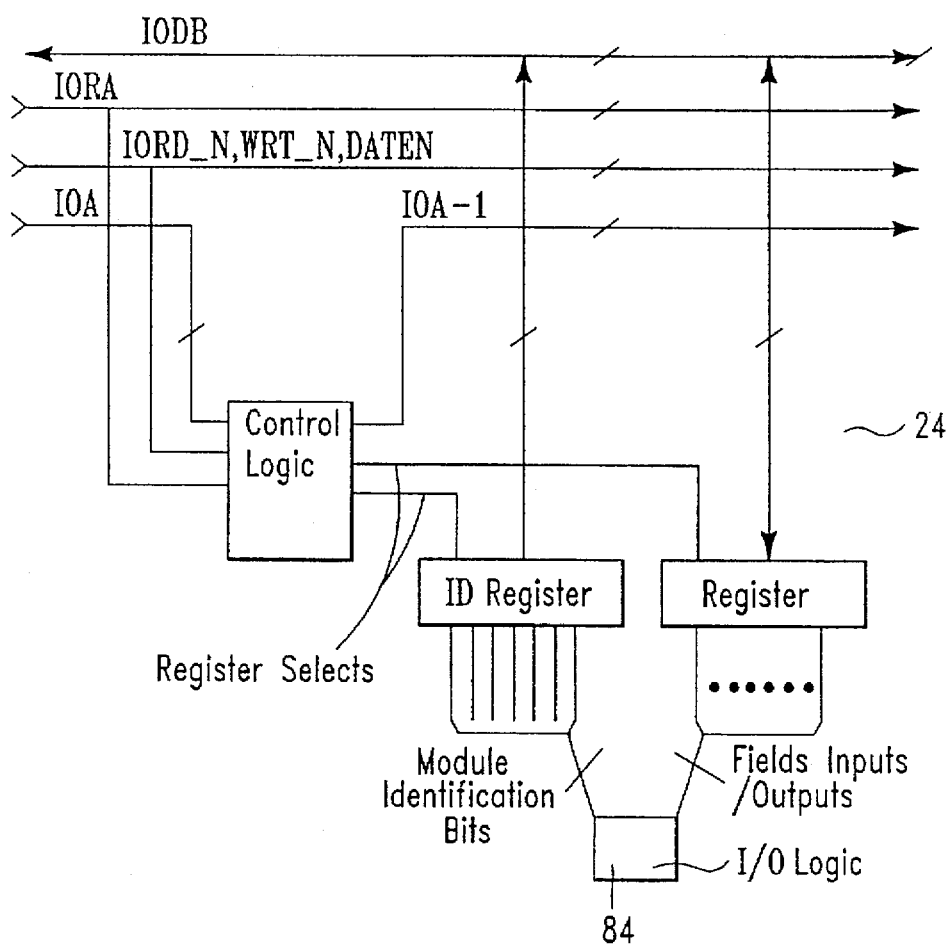
FIG. 8 is a block diagram of the I/O module according to the present invention.

Referring now to FIG. 8 there is shown a functional block diagram of an expansion I/O Module 24 according to the present invention. As previously indicated, a plurality of modules are interconnected end to end using edge card connectors. In the preferred embodiment of the present invention, a maximum of 7 modules may be utilized with a single base unit 22. However, other numbers of modules may be utilized without departing from the scope of the present invention depending upon the environment and capacities of base unit 22. Since the modules 24 do not utilize a common back plane and they are in effect self identifying, most but not all connects are daisy chained. In this regard, the power (not shown) and logical connections are daisy chained from base unit 22 to all modules 24. Signal line IODB is utilized for the I/O databus; IORA is the use for the I/O register address; IOWRT-N is used for the I/O write strobe; IORD-N is used for the I/O read strobe and I/O DATEN is an I/O enable output, all of which are daisy chained through the modules. However, it can be seen that logic lead IOA which is used for I/O module address is logically broken and regenerated at each module.

In the preferred embodiment of the present invention, the IOA module select address is numerically decremented as it passes through each module. A module is recognized when it receives an address of, for example, zero (0) on its IOA line. Therefore, when CPU 22 presents an address of "0" to beginning of the chain, the first module is selected. When the CPU 22 presents an address of 1, the second module sees an address of 0 is selected and so on.

Therefore, upon startup the CPU 22 presents an address of 7 to the first module. This module then checks to see if the address presented is 0, if it is not, the address is decremented by 1 and passed on to the next module and so on and so forth until a module receives an address of 0, thereby letting a module know that its address is 0. As such, if a module does not receive a 0 address it knows that the numbers presented to it is its own module number. Accordingly, an arbitrary mix of I/O modules types may be concatenated without address switches and without a fixed back plane. It is not necessary for an address to be presented from each module to the CPU. The reason for this is that the user program by design knows what modules are connected and their address. Therefore, CPU 22 inherently knows how many modules are supposed to be part of a PLC system 20. It is only important for each module to know its own module number. As such, when CPU 22 requests information from a module, only that particular modules responds and it is therefore not necessary for that module to even present its own address number on signal line IOA. However, it is understood that expansion module 24 may in fact include an address to the CPU without departing from the spirit and the scope of the present invention. Similarly, module IOA addresses could increment as their address numbers are passed along in order for a CPU to ensure or know how many modules are on the line.

It is to be understood that the control logic inherent in modules 24 are digital logic circuitry as readily known and available to one skilled in the art. Interconnected in each I/O module is an ID register which is connected to control logic and signal line IODB. This identification register interacts with I/O and module logic 84 and is used to identify to the processor 22 what type of module is connected to CPU 22. By type of module is specifically meant whether the module 24 is a discrete or analog module, the mix of input and output points and the like, as appropriate.

Similarly, the register is also connected to signal line IODB and control logic and is used to present the specific values read, the external devices or to act on output commands from the CPU 22. As indicated with respect to the identification register, this register is also connected to I/O logic control unit 84. This logic control I/O logic and control unit 84 contains, for example, filters, analog digital and digital-to-analog converters, isolation circuitry and the like as like as readily known for use with I/O.

Figure 9:
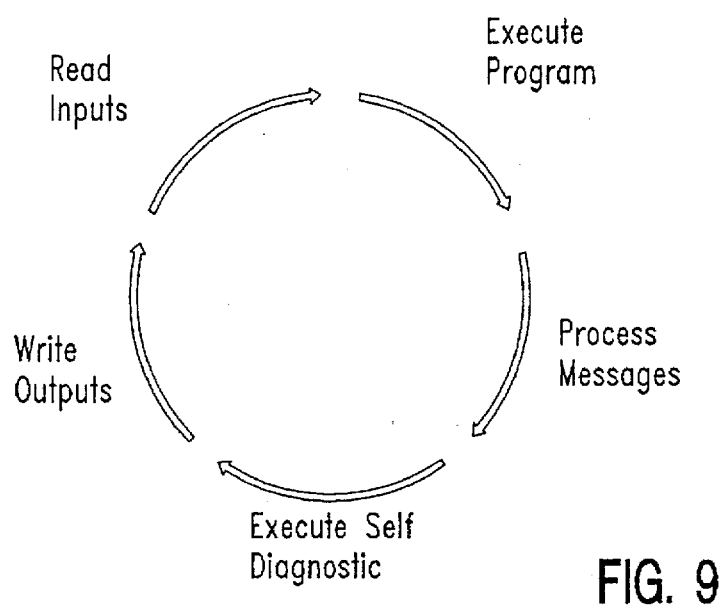
FIG. 9 is a representation of a cyclical scan cycle as utilized by the base unit of the present invention.

Referring now to FIG. 9, there is shown a diagram of a scan cycle as normally used during the RUN mode of CPU 22. It is to be understood that other scan cycles can and may be utilized which take into account other items during normal operation or a different sequence without departing from the spirit and scope of the present invention. Accordingly, in the preferred embodiment of the present invention, the basic scan cycle is comprised of five operations beginning with the read of inputs which is followed by execution of the user program. Thereafter, communication requests are processed which are then followed by internal housekeeping chores as described more fully below. Lastly, all outputs are written as appropriate. However, as described more fully below, enabled user interrupts are serviced according to the priority set forth by the user in order of their occurrence. In the preferred embodiment of the present invention, interrupt processing is performed asynchronously to the scan as interrupt events occur.

As indicated, each scan cycle is begun by a reading of the current value of the input bits and then writing those values to an input image register contained in the RAM (FIG. 7). Thereafter, execution of the program is begun with the program beginning with the first instruction and then forwarded to the end instruction. As such, an immediate I/O instruction preferably provides immediate access to input and outputs during the program or during interrupt routine execution. Further, should the user decide to use interrupts, the routine associated with each interrupt event are stored as part of the program. Interrupt routines are not executed as part of the normal scan cycle as shown in FIG. 9 but are executed only when the interrupt event occurs, which may of course be at any point of the scan cycle.

During the message processing portion of the scan cycle, the PLC base unit 22 processes messages received from the communication port. Thereafter, during the self diagnostic portion of the cycle, internal housekeeping chores are done. These chores include self diagnostic checks periodically done on the programmable logic control or firmware and user program memory as well as I/O module status checks. The last portion of the scan cycle is, with respect to inputs/outputs whereby an image register values are written/ read to/from the input/output modules thereby completing one scan cycle. In the preferred embodiment of the present invention, base unit 22 does not automatically update analog input and output as part of the scan cycle as analog values and therefore does not maintain analog I/O image register. However, these values can be accessed directly from the user program.

Figure 10:
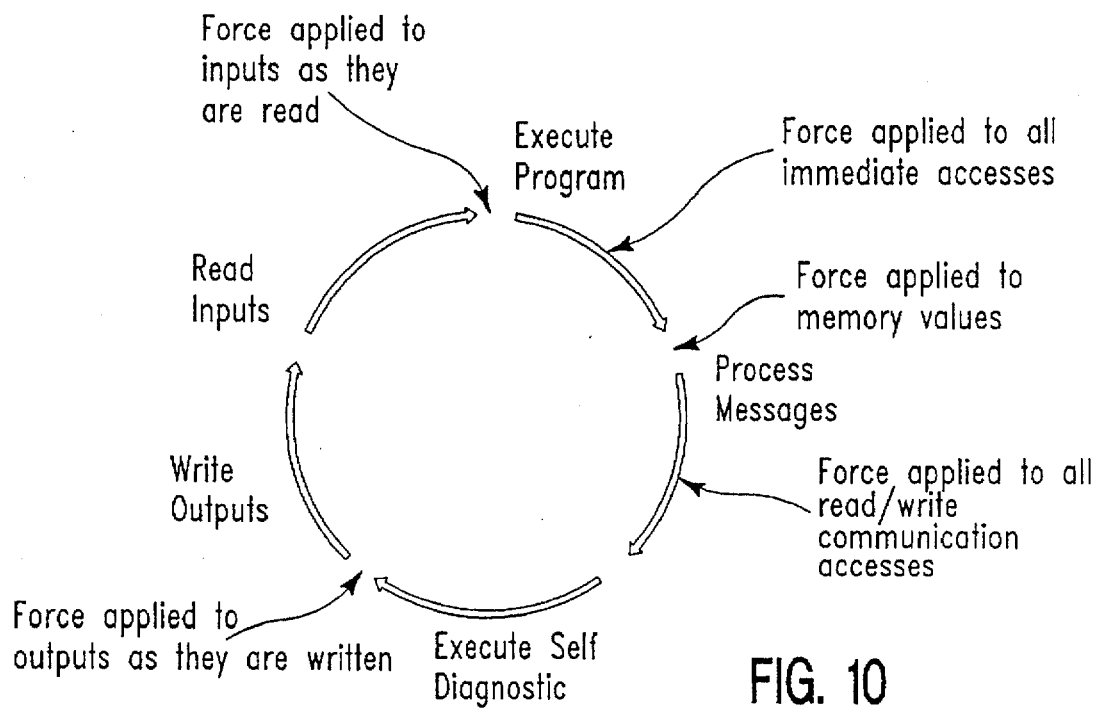
FIG. 10 is a representation similar to FIG. 9 showing how the user may force any or all input and output points during a scan cycle as performed by the base unit of the present invention.

Referring now to FIG. 10, there is shown a force function type scan cycle for use with the present invention. It has been found that this is important not only because normal PLC programming when first run has bugs, but also because of the ability to dynamically change a number of functions, such as interrupts, resets and the like which require careful control and precision. Some examples of the use of force functions is to overwrite input status temporarily in order to de-bug application logic; to overwrite discrete output points variable memory and other data or to skip portions of the user program by enabling a jump instruction with a forced memory bit. During this force function scan cycle as shown in FIG. 10, the forced data values may be changed by the user program; by the input and output updates cycle or by communication processing. As such, base unit 22 re-applies each forced value at various points in the scan cycle and as may be expected may be done prior to, during, or after program execution; during message processing or just prior to output writing.

HIGH SPEED FUNCTIONS AND INTERRUPT FUNCTIONS

It is well known that it is extremely useful and advantageous to utilize an interrupt to handle certain system information which is known at that time. Present PLCs are generally unable to accommodate more than a single interrupt. However, the PLC base unit 22 of the present invention allows for the dynamic assignment of interrupt/event routines by facilitating the speedy handling of such interrupts by tailoring the assigned routine task to take advantage of system information known at the time of the interrupt/event, without waiting for a specific part of a scan cycle. Additionally, the within invention also allows for the deassignment of user program sections in order to allow the user program to transfer control upon the occurrence of an event of interest. It has been found that this is a great advantage over present day PLCs which allow interrupt assignments to be performed only during compilation time thereby rendering them substantially static while the present invention allows for such assignments to be dynamically done during program execution. Accordingly, dynamic user-interrupt routine assignment allows the assignment of a user program section to an event in a dynamic environment while allowing the PLC base unit 22 to automatically perform the control transfer.

In a preferred embodiment of the present invention, base unit 22 supports 8 I/O interrupt events which may be based on rising and falling edge events. However, it is to be understood that a fewer or greater amount of interrupt events may be practiced without departing from the spirit and scope of the present invention. Additionally, the base unit of the present invention allows for two timed interrupts to occur; two serial communications interrupts to occur (receiving/transmitter); up to seven high-speed counter interrupts based on direction change, external reset, and two pulse train output interrupts.

In the preferred embodiment of the present invention these interrupts are all prioritized according to a fixed priority scheme from highest to lowest. Preferably such priority scheme is: is communication; I/O interrupts; and timed interrupts. Each interrupt is serviced by base unit 22 on a first-come-first-served basis within each respective priority assignment. Additionally, only one user-interrupt service routine is ever active at any point in time and if, for example, a timed interrupt is under service, neither a subsequent discrete bit interrupt or a communication interrupt will pre-empt the timed interrupt routine. However, interrupts that occur while another interrupt is being processed are queued for later processing according to the priority scheme mentioned. However, it is to be understood that other prioritizations may be utilized without departing from the spirit and scope of the present invention.

Preferentially, in the preferred embodiment of the present invention, some accumulated logic is saved for use by/during interrupts. Such accumulated logic might include, for example, contact, coil, and accumulated information. Accordingly, to utilize the interrupt function of the present invention, all that is required is to associate an interrupt event and the program segment that the user wishes to execute when that event occurs. This is done by a simple attach instruction during programming of the user program. It has been found that by use of an attach instruction, it is possible for the user to attach multiple interrupts events to one interrupt routine. Additionally, in the preferred embodiment of the present invention it is possible to enable or disable on a global basis all interrupts depending upon the user's specifications. Alternatively, an individual interrupt can be disabled by breaking the association between the interrupt event and the interrupt routine by use of a simple detach instruction which thereby returns the interrupt to inactive or ignored state.

Therefore, by prioritizing and using interrupts according to the category presently mentioned, the user can now perform a greatly enlarged set of functions. One such function is the use of the serial communications port 42 of the base unit 22 which we have referred to as the Freeport mode. In this Freeport mode, the user program can decide upon and would define such characteristics as: baud rate; bits per character; parity; and specific protocol, etc. This is accomplished by use of the receive and transmit interrupts which allow the user to program the base unit in order to facilitate programmed controlled communication.

An example, of a communication port initiated interrupt is the use of the receive function with respect to a barcode reader, a weighing scale, a welder, a security encoded badge, a credit card type reader, to name a few. In this instance, it is totally up to the user as to the protocol desired and as to the actual characters or code utilized to initiate an interrupt. Alternatively, in a transmit function mode, messages may be sent to a printer or display, all as part of the communication interrupt priority scheme mentioned.

In a preferred embodiment of the present invention, a transmit (X/T) message allows the unit to send a buffer of one or more characters with the interrupt generated after the last character of the buffer is sent out. Similarly, reception of communication is performed under interrupt control with each received character generating an interrupt.

As previously mentioned, I/O interrupts include rising/following edge interrupts, high-speed counter interrupts and pulse train output interrupts. The rising and falling events can be captured for each input point while the high-speed counter interrupts allows the user to respond to conditions such as current value reaching a preset value, a change in counting direction (which might correspond to a reversal in the direction of a shaft which is turning—i.e. motors and the like) and an external reset of the counter. Each of the high-speed counter events allows action to be taken in real time and the response to high-speed events that cannot be controlled at normal PLC controller scan speeds. Moreover, the pulse train output interrupts provide immediate notification to the user program of completion of outputting, for example, a prescribed number of pulses such as may be found in a stepper motor.

With respect to the timed interrupt function of the present invention, an interrupt event will transfer control to the appropriate interrupt routine each time the timer expires. This has been found to be extremely useful in sampling of analog inputs at regular intervals. In the preferred embodiment of the present invention, a timed interrupt is enabled and timing begins when an interrupt routine is attached to a timed interrupt event. One of the significant advantages of the present invention is that during this attachment, the system captures the cycle time value such that subsequent changes do not affect the cycle time. This therefore allows a timer to effectively "reset" at midpoints rather than at the beginning of the timer. Accordingly, the user is able to assign a problem block dynamically as events occur in the system.

As previously mentioned, in the preferred embodiment of the present invention, base unit 22 has three high-speed counters resident therein. However, it is to be understood that other numbers of counters can and may be utilized without departing from the spirit and scope of the present invention. The counting direction of these counters (up or down) is controlled by the user programmer using a direction control bit. Each counter has dedicated input for clocks, direction control, reset and start, while a quadrature mode is also provided in order to select between 1× or 4× counting rates. At least two of these clocks in the preferred embodiment of the present invention are completely independent of one another.

Further, when the reset input of a particular clock is activated, the reset clears the current value and holds it as cleared until the reset is deactivated. When the user activates the start input, it allows the counter to count and continue counting while deactivation of the start causes the current value of the counter to be held constant and ignore clocking events. Additionally, if the start input is active while a reset remains active, the current value is cleared. Prior to using a high-speed counter, the counter mode is chosen by using a high-speed counter definition instruction to provide the recited and necessary association between the particular high-speed counter and a counter mode.

Selecting the active states and 1×/4× counter modes of at least one of the counters is done by using control bits which are located in the control byte for the respective counter used when the high-speed counter definition instruction is executed. Thereafter, once the user has defined the counter to be used and the counter mode for that particular counter, the user can then program the dynamic parameters of the counter. Each high speed counter has a control byte that allows the related counter to be enabled or disenabled, its direction to be controlled or the initial counting direction for all the modes, the current value to be reloaded and the preset value to be loaded.

Further, by use of the dynamic interrupt capability as previously described and specifically as part of the high-speed counter, dynamic presetting of values is possible and it is now possible to provide for high-speed pulse train output pipelining queueing. This allows for subsequent operations in parallel with the completed execution of the previous operation. Moreover, the base unit 22 initiates the subsequent operation automatically upon completion of the previous one thereby providing a smooth transition from one sequence to the next, transferring control to a user-specified program at which time the sequence can be completed or another step in the sequence may be pipelined by the users program. This greatly speeds the entire process and more fully utilizes the high-speed capabilities of the present invention by avoiding "deadtime" between steps and a multi-step sequences.

Figure 12:
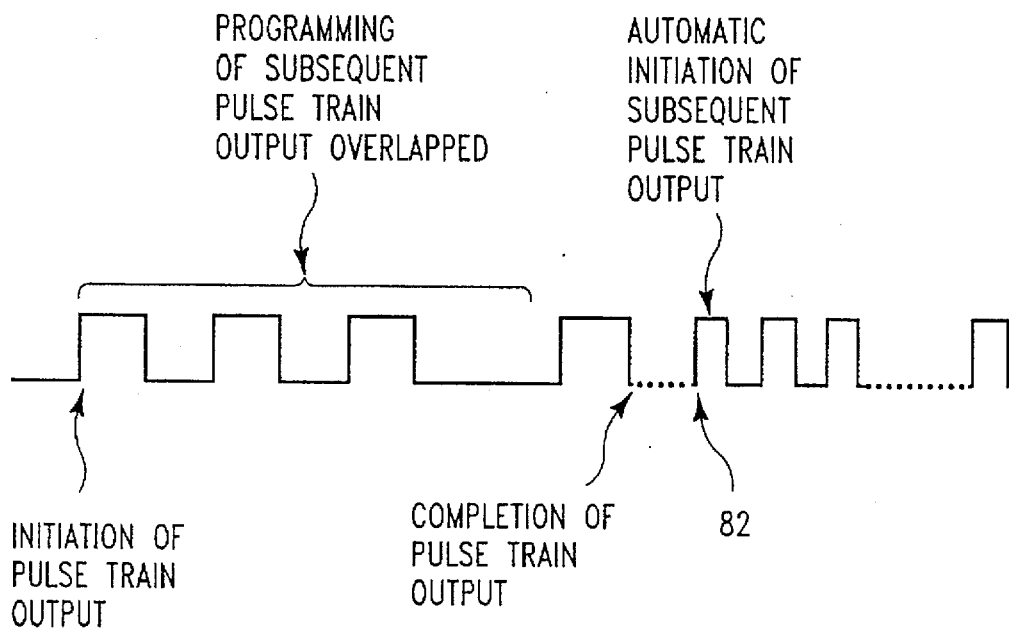
FIG. 12 is a timing diagram indicating high-speed pipelining of events according to the present invention.

Turning now to FIG. 12 there is shown a timing chart indicating how overlapping or pipelining of the subsequent operation with the current operation and automatic initiation of a pipelined operation is performed. In effect the pulse train is similar to the use of presets previously mentioned with respect to the high-speed counter. Further, this provides the ability to change the pulse width or number of counts after a preset interval.

Also, in the preferred embodiment of the present invention, the base unit 22 provides a Pulse Train Output (PTO) having a 50% duty cycle square wave output for a specified number of pulses and a specified cycle time. During pulse width modulation (PWM) functions, the base unit 22 provides a fixed cycle time with a variable duty cycle output. In order to change or invoke the pulse width modulation from its normal continuous mode or function, an update is made by the counter. In this regard, each pulse train output or pulse width modulation generator has inherent therein a control byte which is preferably a control byte, a cycle time value and an unsigned pulse width value, a 16-bit value and a pulse count value which is also unsigned and a 32-byte value. Thereafter, operation is evoked by a simple execution pulse instruction (PLS) in the program which thereby allows the base unit 22 to read the designated memory bit locations and program the PTO or PWM generator accordingly.

In view of the above pulse train output (PTO) pipelining as mentioned is now possible. This is accomplished by use of two status bits in addition to the control information which indicate that the specified number of pulses were generated and/or whether a pipeline or overflow condition has occurred. This PTO function allows at least two pulse output specifications to either be chained together or to be piped one after the other thereby resulting in continuity between subsequent output pulse trains.

Freeport AND USER DEFINABLE COMMUNICATION PROTOCOLS

As previously recited, the present invention utilizes a UART. It has been found that use of a UART in conjunction with the interrupt capability as previously disclosed allows the communication port 42 of the present invention to be completely adaptable to a user defined or definable protocol scheme or schemes which are part of existing standards. However, rather than manufacturing the base unit 22 with a plurality of protocols therein, in the preferred embodiment of the present invention all protocol schemes other than those utilized with respect to PLC programming of the base unit 22 itself, must be copied into the user program. Further, by allowing a user to use/adapt/define a protocol scheme, proprietary schemes which a user may need to interact with for new devices or perhaps very old equipment are now possible.

To utilize and select Freeport mode having user defined protocols, as previously mentioned, communication port 42 may be utilized. In the preferred embodiment of the present invention, all communication with Comm Port 42 is interrupt generated. The user program controls operation of the port through the use of these interrupts such as the receive interrupt, received or transmit interrupts and receive/transmit instructions. Therefore, to invoke or carry on Freeport or variable protocol operation (and the Freeport flag bit has been set so as to establish the communication as a Freeport-as described more fully below) the interrupt feature as previously described is utilized. Once an interrupt has been initiated, the user program, in the fashion previously described, is used to select baud rate, parity, START and STOP bits as well as a plurality of data bits which in the preferred embodiment of the present invention are 7 or 8 data bits wide. Exiting from the Freeport mode is simply accomplished by the end of the interrupt routine or may be disabled and normal communication re-established when CPU 12 is put into the STOP mode.

As mentioned communication with Port 42, initiates an interrupt. However, in order for CPU 22 to different between a programming device 60 being used (the default mode) and a Freeport communication, a flag bit must be set. Therefore, by use of a special flag bit (SF) the effective function of the communication port may be chosen. Therefore, in the preferred embodiment of the present invention, the default or off state of the special flag bit enables the user to use the communication port 42 as a programmer interface such as found for example in FIG. 6. Further, the user program may turn on the special flag bit that controls the communication port's use such that the user program is enabled so as to send or receive messages through this communication port as a Freeport. As described herein, this special flag bit can be user program initiated, I/O initiated or comm port initiated.

Accordingly, in the preferred embodiment of the present invention any communication into the communication port 42 is treated as an interrupt. As previously mentioned, the default state for the special flag bit in this interrupt is for the communication port 42 to act as a normal programmer interface. However, if this flag bit is turned on then the communication port 42 acts as or goes into a Freeport mode allowing the user to define the protocol scheme used. In this fashion, since the communication port always treats communications through the communication port as an interrupt, a protocol scheme can be any scheme including single character or multi-character messages. During the Freeport communication mode, the user program is stopped until the interrupt is terminated/completed. Alternatively, an input from any of the I/O contained on the base unit or any modules or conditions determined by the user program itself may be used to turn the communication port from the programming mode to the Freeport mode by using an interrupt routine.

Another aspect of the Freeport mode is that through port 42, the base unit 22 may communicate with, for example, a printer which may be normally connected to the communication port in order to allow for the printing of error message, values, and the like as appropriate. This therefore allows different types of printers or even recording devices to be used. Another example of such use might be the use of beeper paging. That is where an I/O program condition exists which would in turn initiate an interrupt which allows and instructs the communication port to interact with, for example, a phone line or other communication device under a user interrupt program control. This may be used to dial the beeper or pager number of, for example, a maintenance individual and provide a pre-programmed message such as out of material, machine stopped, etc. Similarly, instead of using a beeper paging scheme, the manufacturing process might use a speech synthesizer to indicate particular faults, draw attention to a particular operator and the like.

Alternatively, another example of Freeport protocol usage is with respect to the use of gasoline pumps and the use of a card reader for smart or standard cards which interacts with the communication port in order to present or validate user account numbers, types of fuel, quantities of fuel permissible and the like with the PLC free to control the fuel pump as appropriate. Alternatively, the PLC Freeport can be utilized to measure quantities of fuel utilized and report same through the communication port to a central authority thereby allowing, for example, tax authorities to compare the amount of fuel pumped with the actual tax paid and due by the fuel retailer/wholesaler.

EXAMPLES

Figure 11:
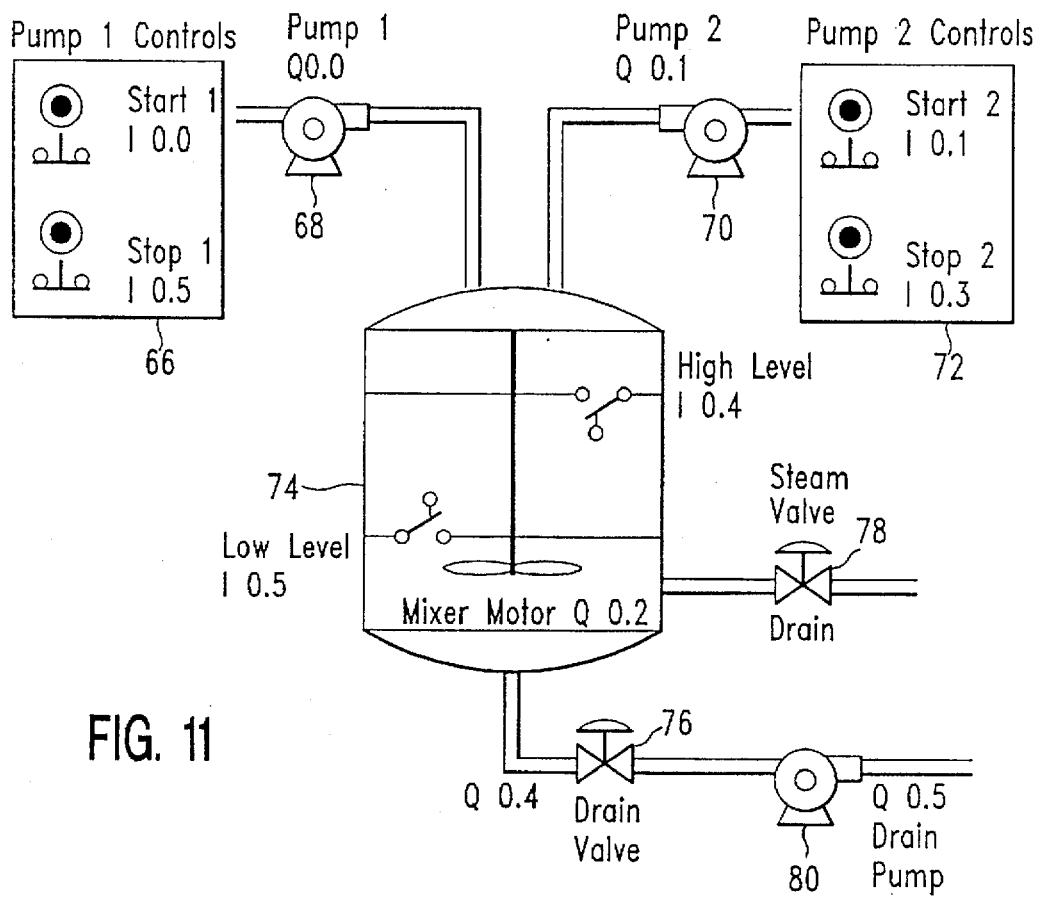
FIG. 11 is a representative diagram of a sample application which may be handled by the PLC system according to the present invention.

Referring now to FIG. 11, there is shown in diagrammatic representation an exemplary sample program which can be solved according to the present invention. More particularly, shown are first and second pump controls 66, 72 which are respectively controlled by first and second pumps 68, 70. A drain pump 80 is disposed adjacent a drain valve 76 which is directly connected to tank 74 while a steam valve 78 is also directly connected to tank 74. In this exemplary scheme, a mixing tank 74 is used for making different colors of paint. As such, there are two pipelines associated with pump controls 1 and 2 respectively with each pipe line bringing in the respective ingredients. A single pipe line at the bottom of the tank 74 adjacent drain valve 76 and drain pump 80 transports the finished paint mixture to the desired intermediate work area (not shown). During operation, it is desirable to control the filling operation, while monitoring the tank level and control a mixing and feeding cycle. Accordingly, the process flow to accomplish this is:

1. Fill the tank.

Wait for the pump start push button switches to be pressed. When they are closed, start 1 and 2. If either pump stop switch is opened, stop that pump.

Fill with paint ingredients until the high level switch closes. Then, turn off both pumps.

2. Mix and heat the ingredients.

Turn on the mixer motor and the steam valve for a designated period (for example, 10 seconds).

3. Drain the mixing tank.

After the mix and heat cycle, drain the vessel by opening the drain valve. Drain the pump until the tank level reaches the low level.

4. Count each cycle.

Count each time the mixing tank goes through a complete/fill/mix/drain cycle.

Referring now to Chart 1 there is shown a sample program 1 for programming and testing logic necessary to program the PLC of the present invention utilizing the example given in FIG. 11. Accordingly, on the left side of the chart can be seen the ladder logic diagrams with actual code shown on the right side of Chart 1. It is to be understood that additional or intermediate steps are not shown as it is submitted that the general programming of PLCs is readily known to one skilled in the art.

EXAMPLE 2

Freeport COMMUNICATION

Another example for use with the present invention is described below. This example illustrates the use of the Freeport communication or variable protocol scheme as previously described and utilizes such communications to receive a character string from a barcode reader. In this example, 8 product types with different barcodes are mixed on a single conveyor line and must be re-directed to either of two destinations for final packaging. The barcode reader reads barcodes consisting of 12 ASCII characters that are terminated by a carriage return and a line-feed character. Upon receipt of the carriage return and line-feed characters, the barcode is examined. Based on the barcode value, a diverter bar is activated to send the products to bin A or B. The last 4 digits of the barcodes determine the bin the product is to go into. The within example utilizes or assumes that exemplary data values (V0–V95) for the particular database (DB1) were downloaded when the user program was downloaded. Accordingly, tables 1–4, below show and describe various addresses and parameters utilized.

The inputs and outputs utilized are described in table 1. As can be seen, the number of bytes corresponds to the size of the address. Further, it can be seen that Table 1 deals with I/O functions performed by the base unit 22, with Tables 2, 3 and 4 as described more fully below dealing with internal movement of data and the like within base unit 22. Table C2 deals with permanent data storage and it can been seen that a 12 bit byte corresponds to 12 bits of address as appropriate. Similarly, Table C3 deals with volatile data storage with the same byte and address sizes, while Table 4 deals with sub-routine interrupt descriptions which govern the overall operation of the entire sample program.

Referring now to Chart 2, there is shown the main, sub-routine and interrupt routines incident to carrying out the exemplary barcode reading program as suggested above. As can be seen from a review of Chart 2, various sections of the chart correspond to the functions and descriptions enumerated in Tables 1, 2, 3 and 4.

CHART 1

Sample Program 1: Programming and Testing Logic

Main Program

Network 1

```
       I0.0      I0.2      I0.4
   ----| |------| |------|/|------( Q0.0 )
   |       |
   |  Q0.0 |
   ----| |--
```

| Network 1 | | //Load value of I 0.0 |
|---|---|---|
| LD | I 0.0 | //Or with Q 0.0 value |
| O | Q 0.0 | //And with I 0.2 value |
| A | I 0.2 | //And Not with I 0.4 |
| AN | I 0.4 | //Assign result to Q 0.0 |
| = | Q 0.0 | |

Network 2

```
       I0.1      I0.3      I0.4
   ----| |------| |------|/|------( Q0.1 )
   |       |
   |  Q0.1 |
   ----| |--
```

| Network 2 | | //Load value of I 0.1 |
|---|---|---|
| LD | I 0.1 | //Or with Q 0.1 value |
| O | Q 0.1 | //And with I 0.3 value |
| A | I 0.3 | //And Not with I 0.4 |
| AN | I 0.4 | //Assign result to Q 0.1 |
| = | Q 0.1 | |

Network 3

```
       I0.4
   ----| |------------------( M0.1 S )
```

| Network 3 | | //Load value of I 0.4 |
|---|---|---|
| LD | I 0.4 | //Set M 0.1 to 1 (on) |
| S | M 0.1 | |

Network 4

```
       M0.1                    T37
   ----| |-------------------[ TON ]
                              IN
                       100 --PT
```

| Network 4 | | //Load value of M0.1 |
|---|---|---|
| LD | M 0.1 | //Timer 37, |
| TON | T37,100 | //PT = --preset |
| | | //100 (@ 0.1 secs) |

Network 5

```
       T37       M0.1
   ----|/|------| |------( Q0.2 )
                    |
                    ---( Q0.3 )
```

| Network 5 | | //Load Not value of T37 bit |
|---|---|---|
| LDN | T37 | //And with value of M 0.1 |
| A | M 0.1 | //Assign result to Q 0.2 |
| = | Q 0.2 | //Assign result to Q 0.3 |
| = | Q 0.3 | |

Network 6

```
       T37       I0.5
   ----| |------|/|------( Q0.4 )
                    |
                    ---( Q0.5 )
```

| Network 6 | | //Load value of T37 bit |
|---|---|---|
| LD | T37 | //And Not value of I 0.5 |
| AN | I 0.5 | //Assign result to Q 0.4 |
| = | Q 0.4 | //Assign result to Q 0.5 |
| = | Q 0.5 | |

Network 7

```
       I0.5      T37            CT30
   ----| |------| |---------[ CTU ]
                             CU
       I0.7
   ----| |---------------------
                             RESET
                       12 --PT
```

| Network 7 | | //Load value of I 0.5 |
|---|---|---|
| LD | I 0.5 | //And value of T37 bit |
| A | T37 | //Load value of I 0.7 |
| LD | I 0.7 | //Counter 30, |
| CTU | C30, 12 | //PT = preset of 12 |

Network 8

```
       I0.5      T37
   ----| |------| |------( M0.1 R )
```

| Network 8 | | //Load value of I 0.5 |
|---|---|---|
| LD | I 0.5 | //And value of T37 bit |
| A | T37 | //Reset value of M 0.1 to 0 |
| R | M 0.1 | |

TABLE 1

Inputs and Outputs

| Address | Size | Description of Function |
|---|---|---|
| Q0.0 | Bit | Activated to cause the diverter bar to direct product to bin A |
| Q0.1 | Bit | Activated to cause the diverter bar to direct product to bin B |

TABLE 2

Permanent Data Storage

| Address | Size | Description of Function |
|---|---|---|
| V0–V11 | Byte | Bar code 1 - ASCII character string for product 1 that goes into bin A |
| V12–V23 | Byte | Bar code 2 - ASCII character string for product 2 that goes into bin A |
| V24–V35 | Byte | Bar code 3 - ASCII character string for product 3 that goes into bin A |
| V36–V47 | Byte | Bar code 4 - ASCII character string for product 4 that goes into bin A |
| V48–V59 | Byte | Bar code 5 - ASCII character string for product 5 that goes into bin A |
| V60–V71 | Byte | Bar code 6 - ASCII character string for product 1 that goes into bin B |
| V72–V83 | Byte | Bar code 7 - ASCII character string for product 2 that goes into bin B |
| V84–V95 | Byte | Bar code 8 - ASCII character string for product 3 that goes into bin B |

TABLE 3

Volatile Data Storage

| Address | Size | Description of Function |
|---|---|---|
| V100–V111 | Byte | Receive buffer for the bar code |

TABLE 4

Subroutine and Interrupt Descriptions

| | Description |
|---|---|
| SBR | |
| 0 | Initialization subroutine |
| INT | |
| 0 | Quiet line receive routine (used to find dead time between messages from the bar code reader) |
| 10 | Quiet line receive routine (throws away characters received until a quiet line is found) |
| 11 | Receive the bar code |
| 12 | Receive the carriage return |
| 13 | Receive the line feed |

CHART 2

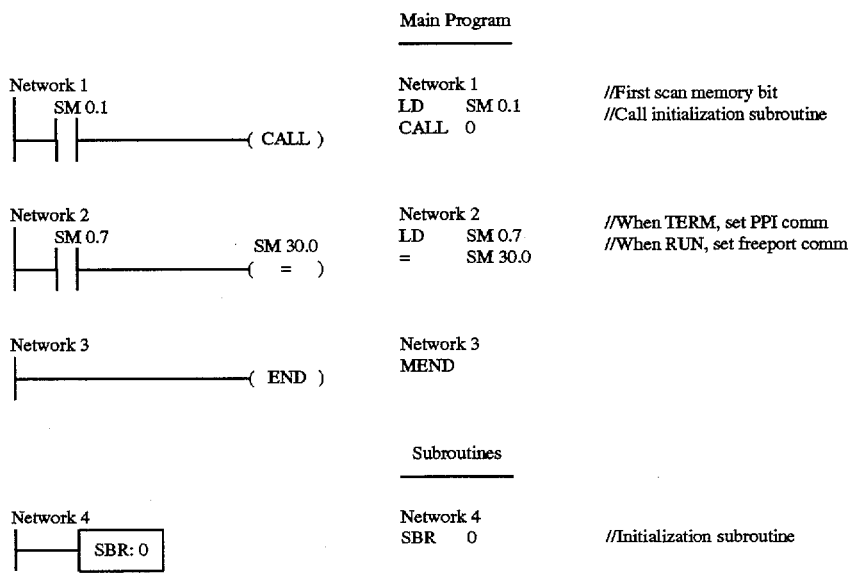

CHART 2-continued

Network 5
```
LD      SM 0.0

MOVB    9, SMB30

MOVB    5, SMB34

ATCH    0, 10
ATCH    10, 8

ENI
```
//Enable logic using the always ON memory bit
//9600 baud, no parity, 8 bits/characters
//Set up a timed interrupt value of 5 ms
//Set up the quiet line timer routine
//Set up the quiet line receive interrupt
//Global interrupt enable Network 6
```
RET
```
//Terminate the subroutine

Interrupt Routines

Network 7
```
INT     0
```
//Quiet line timer

Network 8
```
LD      SM 0.0

MOVD    &VB100, AC1

MOVW    12, AC0
ATCH    11, 8
```
//Enable logic using the always ON memory bit
Load a printer to the start of the receive buffer
//Load the character count
//Set up to receive the next bar code Network 9
```
RETI
```
//Terminate the subroutine Network 10
```
INT     10
```
//Quiet line receive interrupt Network 11
```
LD      SM 0.0

ATCH 0, 10
```
//Enable logic using the always ON memory bit
//Retrigger the quiet line timer on each character Network 12
```
RETI
```
//Terminate the subroutine Network 13
```
INT     11
```
//Receive the bar code CHART 2-continued

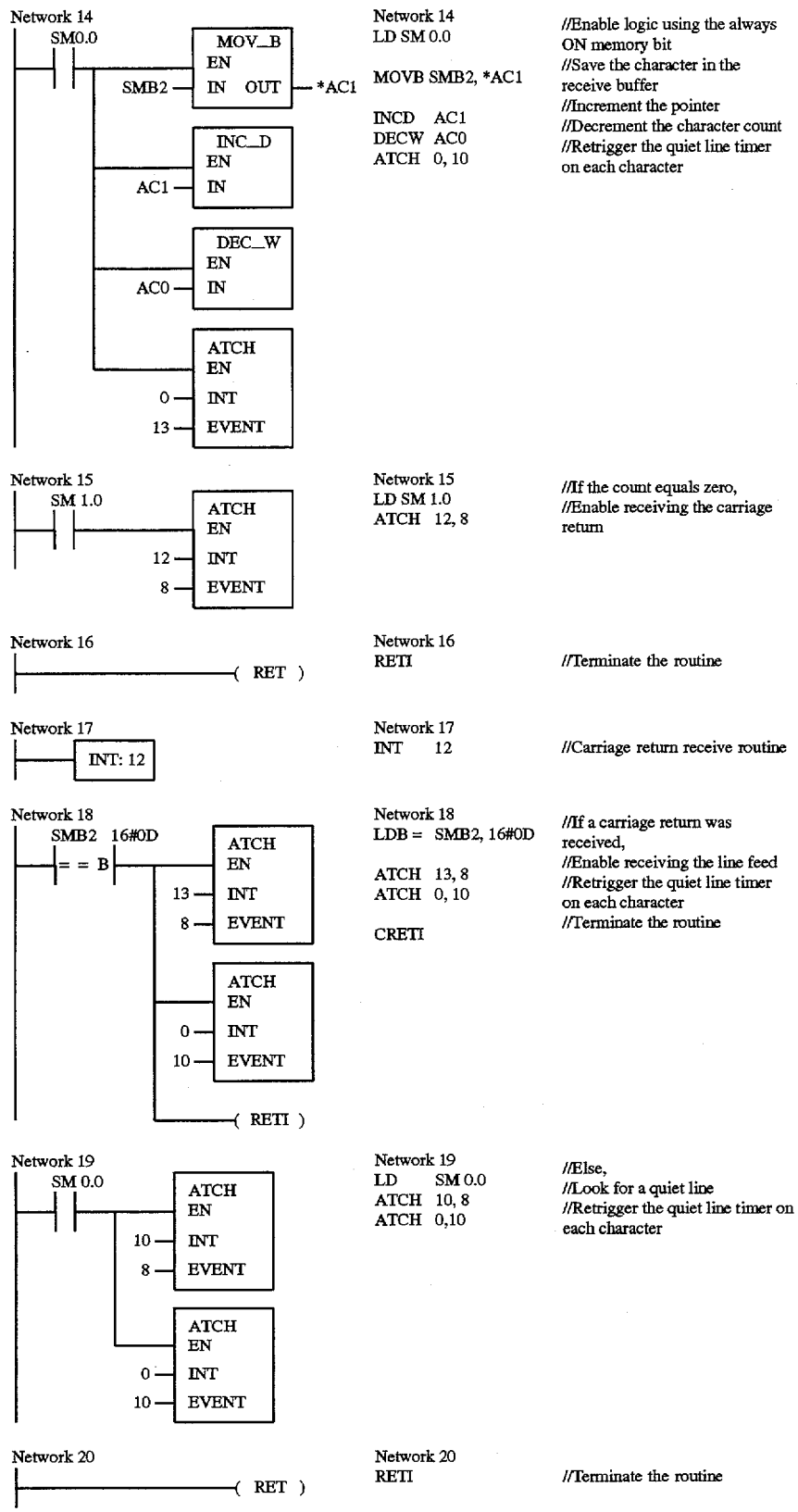

Network 14
LD SM 0.0

MOVB SMB2, *AC1

INCD AC1
DECW AC0
ATCH 0, 10

//Enable logic using the always ON memory bit
//Save the character in the receive buffer
//Increment the pointer
//Decrement the character count
//Retrigger the quiet line timer on each character Network 15
LD SM 1.0
ATCH 12, 8

//If the count equals zero,
//Enable receiving the carriage return

Network 16
RETI

//Terminate the routine

Network 17
INT    12

//Carriage return receive routine

Network 18
LDB = SMB2, 16#0D

ATCH 13, 8
ATCH 0, 10

CRETI

//If a carriage return was received,
//Enable receiving the line feed
//Retrigger the quiet line timer on each character
//Terminate the routine Network 19
LD    SM 0.0
ATCH 10, 8
ATCH 0,10

//Else,
//Look for a quiet line
//Retrigger the quiet line timer on each character Network 20
RETI //Terminate the routine

CHART 2-continued

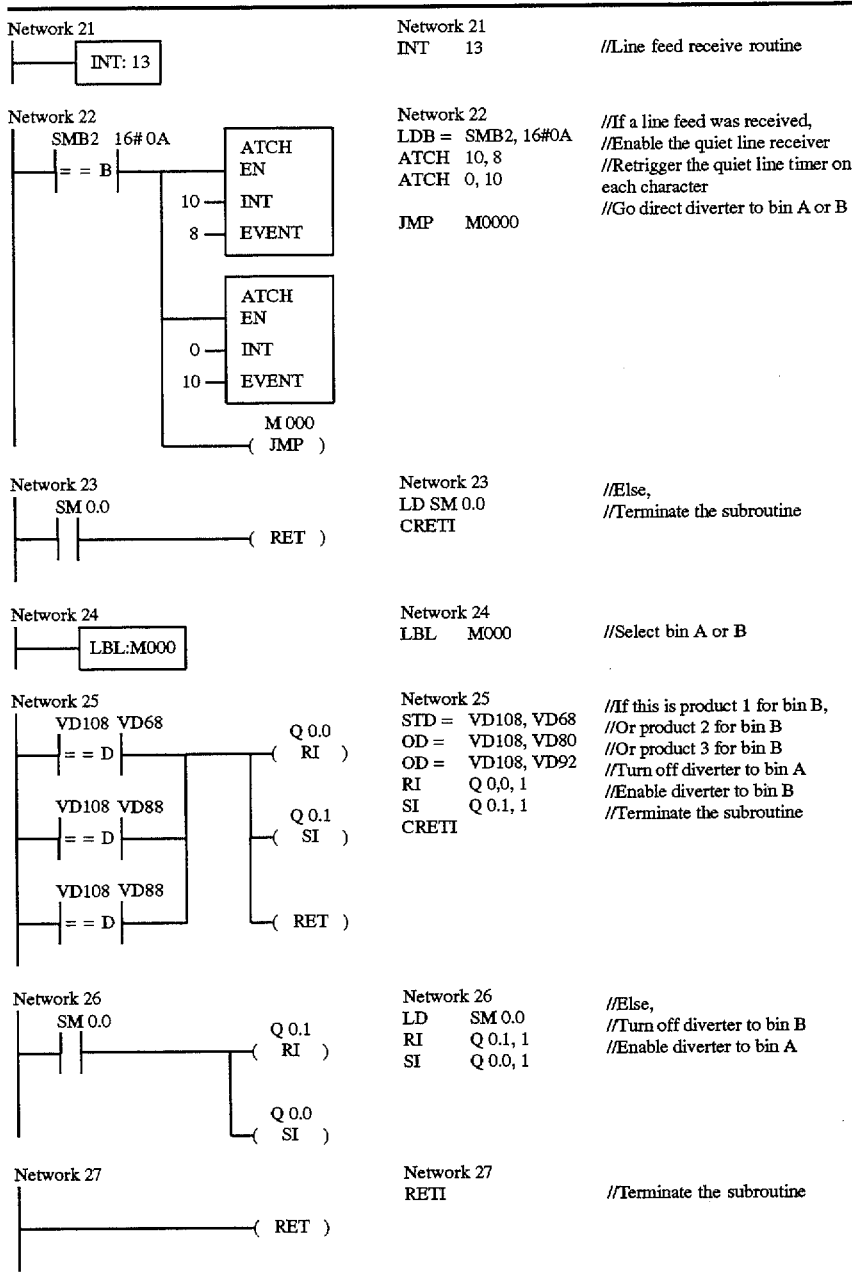

```
Network 21
INT     13                    //Line feed receive routine

Network 22
LDB =   SMB2, 16#0A           //If a line feed was received,
ATCH    10, 8                 //Enable the quiet line receiver
ATCH    0, 10                 //Retrigger the quiet line timer on
                              each character
JMP     M0000                 //Go direct diverter to bin A or B Network 23
LD SM 0.0                     //Else,
CRETI                         //Terminate the subroutine Network 24
LBL     M000                  //Select bin A or B Network 25
STD =   VD108, VD68           //If this is product 1 for bin B,
OD =    VD108, VD80           //Or product 2 for bin B
OD =    VD108, VD92           //Or product 3 for bin B
RI      Q 0,0, 1              //Turn off diverter to bin A
SI      Q 0.1, 1              //Enable diverter to bin B
CRETI                         //Terminate the subroutine Network 26
LD      SM 0.0                //Else,
RI      Q 0.1, 1              //Turn off diverter to bin B
SI      Q 0.0, 1              //Enable diverter to bin A Network 27
RETI                          //Terminate the subroutine
```

What is claimed is:

1. A programmable logic controller, operable to communicate with external hardware under one of a plurality of predefined communication protocols different from resident communication protocols of said programmable logic controller, said controller comprising:

a communications port responsive to a predetermined condition for switching between a first mode of communications for communicating between the programmable logic controller and the external hardware using one of the plurality of communication protocols, and a second mode of communications for communicating between the programmable logic controller and a programming device using one of the resident communication protocols;

a memory for storing a resident program, said memory being configurable with one of the plurality of communication protocols;

a removable memory cartridge for at least one of i) uploading the resident program from the memory to the removable memory cartridge and ii) downloading the resident program to the memory from the removable memory cartridge, the program being configurable with one of the plurality of communication protocols;

processing means, coupled to the memory and coupled to the communications port, for executing the resident program for transferring a plurality of data values between said programmable logic controller and said external hardware, and for detecting the predetermined condition and causing the communications port to switch from the second mode to the first mode of communications;

input means for receiving input data values of the plurality of data values from said external hardware, said input means being coupled to said processing means; and, output means for transmitting output data values of the plurality of data values to said external hardware, said output means being coupled to said processing means.

2. The programmable logic controller of claim 1, wherein said memory configurable with said one of a plurality of predefined communication protocols is electrically erasable programmable read only memory (EEPROM).

3. The programmable logic controller according to claim 1, wherein said predetermined condition is initiated by at least one of said resident program, by a predetermined input event through said input means, and by a predetermined output event through said output means.

4. The programmable logic controller according to claim 1, wherein said predetermined condition is caused by an interrupt routine to store said one of a plurality of predefined communications protocols in said memory.

5. The programmable logic controller according to claim 1, wherein said one of a plurality of predefined communication protocols includes one of single character messages and multi-character messages.

6. The programmable logic controller according to claim 1, wherein said communications port is normally operable to interconnect a plurality of said programmable logic controllers for communication under said resident communication protocols.

7. The programmable logic controller according to claim 4, wherein said interrupt routine is initiated by a special flag bit being transmitted to said programmable logic controller.

8. A method for operating a communications port of a programmable logic controller utilizing a resident protocol for internal processing to communicate under one of a plurality of predefined communication protocols, different from the resident protocol, which predefined communications protocols are used by external hardware, said method comprising the steps of:

alerting said programmable logic controller to switch the communications port between a first mode of communications for communicating between the programmable logic controller and the external hardware using one of the plurality of predefined communications protocols and a second mode of communications for communicating between the programmable logic controller and a programming device using the resident communications protocol;

configuring an operating program stored in said programmable logic controller to use said one of a plurality of predefined communications protocols and the resident communications protocol;

uploading said operating program from said programmable logic controller to a removable memory cartridge in response to a first command from said programmable logic controller;

downloading said operating program from said removable memory cartridge to said programmable logic controller in response to a second command from said programmable logic controller; and, executing communications by said operating program with said external hardware under said one of a plurality of predefined communications protocols while said programmable logic controller is still under the alert of said change in communications protocols.

9. The method of claim 8, wherein the step of said alerting is accomplished by setting a special flag bit to a predetermined state to activate a predetermined port to said programmable logic controller to permit said specifying said one of a plurality of predefined communication protocols.

10. The method of claim 8, wherein said special flag bit being set to said predetermined state causes an interrupt to occur in said operating program allowing said specifying said one of a plurality of predefined communications protocols.

11. The method of claim 8, wherein said predetermined port is a communications port.

12. The method of claim 8, wherein said one of a plurality of predefined communication protocols includes one of single character messages and multi-character messages.

13. The method of claim 8, wherein said specifying includes copying said one of a plurality of predefined communication protocols into memory responsive to said operating program.

14. The method of claim 13, wherein said one of a plurality of predefined communication protocols is copied or to an electrically erasable programmable read only memory (EEPROM).

* * * * *